United States Patent
Lee et al.

(10) Patent No.: US 9,306,235 B2
(45) Date of Patent: *Apr. 5, 2016

(54) REDOX FLOW BATTERY

(75) Inventors: Myung-jin Lee, Seoul (KR); Duk-jin Oh, Seoul (KR); Seung-sik Hwang, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 1202 days.

This patent is subject to a terminal disclaimer.

(21) Appl. No.: 13/184,764

(22) Filed: Jul. 18, 2011

(65) Prior Publication Data

US 2012/0171530 A1 Jul. 5, 2012

(30) Foreign Application Priority Data

Dec. 31, 2010 (KR) .................. 10-2010-0140681

(51) Int. Cl.
| | |
|---|---|
| *H01M 8/20* | (2006.01) |
| *H01M 8/18* | (2006.01) |
| *B60L 11/00* | (2006.01) |
| *B60L 11/14* | (2006.01) |
| *B60L 11/18* | (2006.01) |

(52) U.S. Cl.
CPC ............ *H01M 8/188* (2013.01); *B60L 11/005* (2013.01); *B60L 11/14* (2013.01); *B60L 11/1879* (2013.01); *B60L 11/1887* (2013.01); *H01M 2300/0025* (2013.01); *Y02E 60/528* (2013.01); *Y02T 10/70* (2013.01); *Y02T 10/705* (2013.01); *Y02T 10/7022* (2013.01); *Y02T 10/7077* (2013.01); *Y02T 90/34* (2013.01)

(58) Field of Classification Search
CPC combination set(s) only.
See application file for complete search history.

(56) References Cited

U.S. PATENT DOCUMENTS

| | | | |
|---|---|---|---|
| 7,411,772 B1 | 8/2008 | Tymes | |
| 2009/0017379 A1* | 1/2009 | Inatomi et al. | ................ 429/213 |

FOREIGN PATENT DOCUMENTS

| | | |
|---|---|---|
| JP | 2004-175667 | 6/2004 |
| JP | 2006-092748 | 4/2006 |
| JP | 2007-213924 | 8/2007 |
| JP | 2008-066407 | 3/2008 |

OTHER PUBLICATIONS

"A rechargeable redox battery utilizing ruthenium complexes with non-aqueous organic electrolyte" Department of Industrial Chemistry, Nara University of Education, Tabatake-Cho, Nara 630, Japan, published Apr. 1988.*

* cited by examiner

*Primary Examiner* — Jacob Marks
(74) *Attorney, Agent, or Firm* — Cantor Colburn LLP

(57) ABSTRACT

Provided are redox flow batteries employing supporting electrolyte of a ring- or spiro-type structure and having high energy efficiencies and energy densities.

14 Claims, 3 Drawing Sheets

REDOX FLOW BATTERY

CROSS-REFERENCE TO RELATED APPLICATIONS

This application claims the benefit of Korean Patent Application No. 10-2010-0140681, filed on Dec. 31, 2010, in the Korean Intellectual Property Office, the disclosure of which is incorporated herein in its entirety by reference.

BACKGROUND OF THE INVENTION

1. Field

The present disclosure relates to redox flow batteries, and more particularly, to redox flow batteries having high energy efficiencies and energy densities.

2. Description of the Related Art

Secondary batteries are highly effective systems for storing energy, and are used in various applications from small mobile phones to medium and large electric power storage systems. Particularly, they are used as major parts in the fields of semiconductors and liquid crystals; acoustics, and communications such as cellular phones and notebooks. Also, they have been recently used as power sources for hybrid automobiles.

Such systems for storing electric power require more stable supplies of energy and high levels of effectiveness in energy conversion. In this context, redox flow batteries have received great attention as secondary cells having high values in power and durability, and suitability for large electric power storage systems.

Contrary to other batteries having solid active substances, redox flow batteries have ions in an aqueous solution as active substances, and are worked by a mechanism in which electric energy is generated and stored by oxidation/reduction reactions of the ions on a cathode and an anode.

In other words, redox flow batteries contain electrolyte solutions (solution) in which active substances for the electrodes are dissolved in solvents. If a battery consisting of a catholyte and an anolyte having different oxidation states is charged, an oxidation reaction is generated on the cathode, and a reduction reaction is generated on the anode. In this case, the electromotive force for the battery is determined by the difference in the standard electrode potentials ($E^0$) of the redox couples constituting the catholyte and the anolyte. The electrolyte may be supplied from an electrolyte tank by a pump. Such batteries have both the advantages of general cells having rapid rates of redox reactions on the surfaces of the cathode and anode, and of fuel cells having high power.

SUMMARY OF THE INVENTION

One aspect of the invention relates to redox flow batteries having high energy efficiencies and energy densities.

One aspect of the invention relates to a redox flow battery comprising: a cathode cell including a cathode and a catholyte solution; an anode cell including an anode and an anolyte solution, and an ion exchange membrane disposed between the cathode cell and the anode cell, wherein each of the catholyte solution and the anolyte solution includes a non-aqueous solvent, a supporting electrolyte and a metal-ligand coordination compound, and wherein the supporting electrolyte includes at least one salt selected from the group consisting of those having the following Formula 1 or Formula 2:

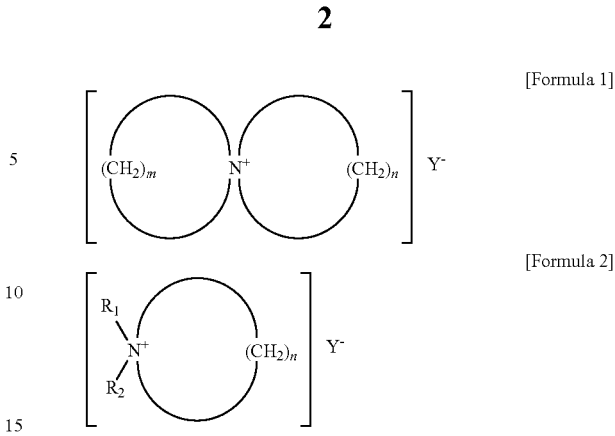

wherein, m is an integer of 3 to 7, n is an integer of 3 to 7, $Y^-$ represents a counter anion, $R_1$ and $R_2$ each represent, independently, an alkyl group having from 1 to about 5 carbon atoms, or an alkoxy group having from 1 to about 5 carbon atoms.

More particularly, $Y^-$ may be at least one counterion selected from the group consisting of $BF_4^-$, $Cl^-$, $Br^-$, $I^-$, $SO_4^{2-}$, $PF_6^-$, $ClO_4^-$ and $CF_3SO_3^-$.

Additional aspects and/or advantages of the invention will be set forth in part in the description which follows and, in part, will be obvious from the description, or may be learned via practice of the invention by those skilled in the art.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
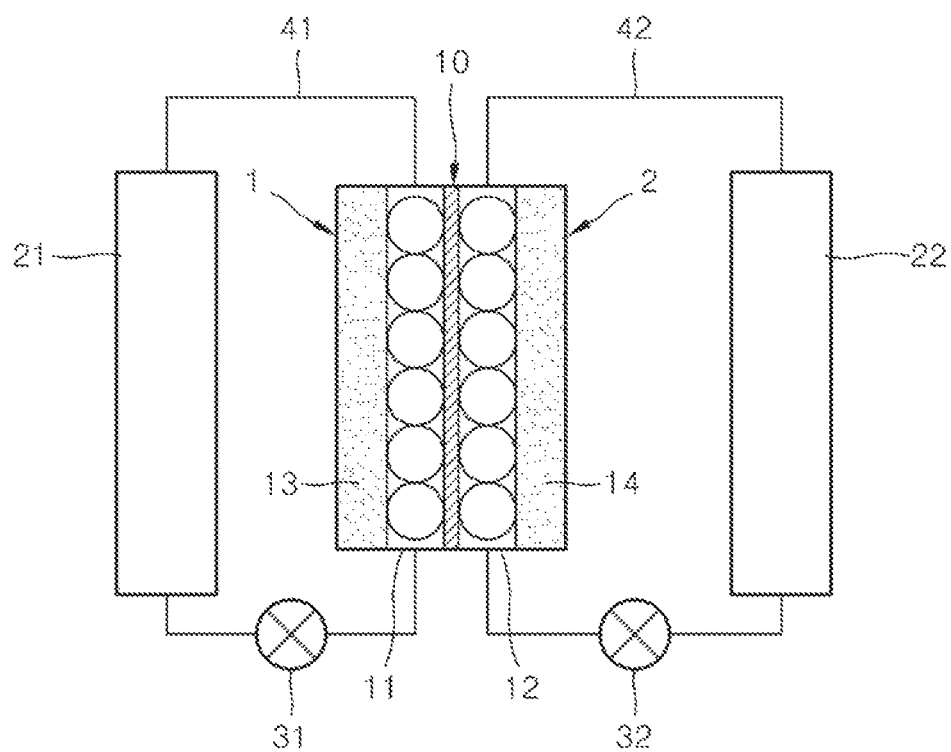
FIG. 1 is a view illustrating the configuration of a redox flow battery according to an aspect of the invention.

Reference will now be made in detail to the present embodiments of the invention, examples of which are illustrated in the accompanying drawings, wherein like reference numerals refer to like elements throughout. The embodiments are described below in order to explain the invention by referring to the figures.

Hereinafter, a redox flow battery according to the invention will be described in detail with reference to one or more embodiments, but these embodiments may have different forms and should not be constructed as being limited to the descriptions set forth herein.

FIG. 1 shows a redox flow battery according to an aspect of the invention.

As can be seen in FIG. 1, the redox flow battery has a cathode cell 1 and an anode cell 2 separated by ion exchange membrane 10. The cathode cell 1 and anode cell 2 include a cathode 13 and an anode 14, respectively. The cathode cell 1 is connected to a catholyte solution tank 21 from which a catholyte solution 11 is supplied and discharged through pipe 41. Similarly, the anode cell 2 is connected to an anolyte solution tank 22 from which an anolyte solution 12 is supplied and discharged through pipe 42. The electrolyte solutions are circulated through pumps 31 and 32, and charging/discharging occurs according to changes of the oxidation states of ions in the cathode 13 and the anode 14. The ion exchange membrane 10 allows the transfer of electric charge-carrying ions in a supporting electrolyte, but prevents active ions in the catholyte solution 11 and anolyte solution 12 from being mixed.

According to an embodiment of the invention, a redox flow battery includes a cathode cell including a cathode and a catholyte solution; an anode cell including an anode and an anolyte solution; and an ion exchange membrane disposed between the cathode cell and the anode cell, wherein each of the catholyte solution and the anolyte solution includes a non-aqueous solvent, a supporting electrolyte and a metal-ligand coordination compound, wherein the supporting electrolyte includes at least one salt selected from the group consisting of those having the following Formula 1 or Formula 2.

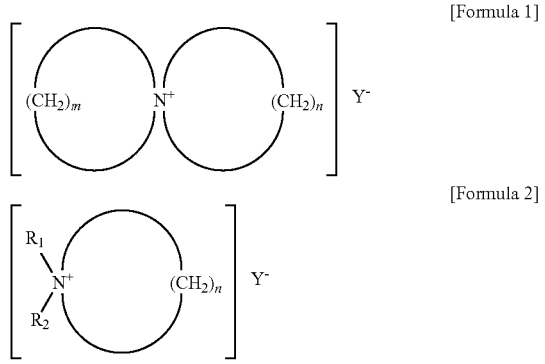

[Formula 1]

[Formula 2]

Wherein:
m is an integer of 3 to 7,
n is an integer of 3 to 7,
$Y^-$ represents a counter anion, and
$R_1$ and $R_2$ each represent, independently, an alkyl group having from 1 to about 5 carbon atoms or an alkoxy group having from 1 to about 5 carbon atoms.

A redox flow battery is discharged by connecting the battery to an external circuit and supplying electric loadings and flowing currents to the external circuit. Charging is performed by connecting the battery to an external power supply and supplying a current to the redox flow battery.

A catholyte is generally charged when a redox couple is oxidized toward a higher value of two oxidation states, and is discharged when the redox couple is reduced toward a lower value of two oxidation states. To the contrary, an anolyte is charged when the redox couple is reduced toward the lower value of two oxidation states, and is discharged when the redox couple is oxidized toward the higher value of two oxidation states.

Cathode
$C^n$ ($C^{n-y}$+$ye^-$ (charge)
$C^{n-y}$+$ye^-$ ($C^n$ (discharge)
(C: catholyte)
Anode
$A^{n-x}$+$xe^-$ ($A^n$ (charge)
$A^n$ ($A^{n-x}$+$xe^-$ (discharge)
(A: anolyte)

In cases of general redox flow batteries using aqueous solvents, since the working potential is limited to the water-electrolyzing potential area, the operating voltage and hence energy density are both low. In order to solve this problem, non-aqueous solvents may be used.

A supporting electrolyte used in redox flow batteries does not participate directly in reactions, but plays a role in maintaining an electric charge balance between the catholyte solution and the anolyte solution.

Conventionally, quaternary ammonium salts dissolved in solvents such as PC and GBL, for example, have been used as electrolytes, and an electromotive force was generated as anions were transferred into a positive electrode and cations were transferred into a negative electrode in the solution. To the contrary, according to the invention, metal-ligand coordination compounds act as electrolytes, and thus the electromotive force is generated by redox reactions of a central metal. In addition, ammonium salts of Formula 1 or Formula 2 act as supporting electrolytes to facilitate redox reactions by transferring its cations or anions depending on the type of ion exchange membrane.

As linear salts generally used as supporting electrolytes, for example, tetraethylammoniumtetrafluoroborate (TEABF$_4$), and triethylmethylammoniumtetrafluoroborate (TEMABF$_4$), have low solubilities in non-aqueous solvents, and precipitates may be generated in cases where organic electrolytes are used at a high concentrations. Thus, improvements in the energy densities of batteries is limited, and the effectiveness of the batteries is reduced due to side reactions (e.g., Hoffmann reaction). The Hoffmann reaction is one by which tetraethylammoniumtetrafluoroborate is decomposed into triethylamine and ethylene, for example, as shown in the following Scheme 1. Thus, TEABF$_4$ may not sufficiently exert the function of supporting electrolyte due to such side reactions.

[Scheme 1]

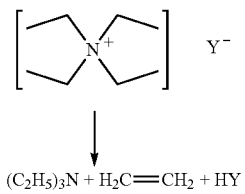

$(C_2H_5)_3N + H_2C\!\!=\!\!CH_2 + HY$ $Y = BF_4^-$

According to an embodiment of the invention, since the molecular structures of ring- or spiro-type ammonium salts represented by Formula 1 or Formula 2 have smaller sizes than those of general linear ammonium salts, they will have higher solubilities in non-aqueous solvents. Therefore, when ammonium salts represented by Formula 1 or Formula 2 are used as supporting electrolytes, a high concentration of organic electrolyte (i.e. metal-ligand coordination compound) may be used, resulting in increased energy density of the battery. Furthermore, since side reactions such as the decomposition of supporting electrolyte are inhibited, the discharge rate of redox flow batteries is enhanced and the effectiveness thereof improved.

Specifically, cations of ring- or spiro-type ammonium salts have smaller sizes; i.e., up to about 30% less than those of general linear ammonium salts, as measured by calculating molecular orbital functions. Therefore, ring- or spiro-type ammonium salts form tight and small molecules which have higher diffusion coefficients than those of linear ammonium salts. Furthermore, in cases of ring- or spiro-type ammonium salts, two charge transfer methods for achieving the distribution of electric charges; i.e., ion hopping mechanism and diffusion mechanism may both be involved. Therefore, the transfer of electric charges may be rapidly performed as compared to cases involving linear ammonium salts which rely only on the diffusion mechanism.

For the above reasons, in a redox flow battery according to an embodiment of the invention, when a supporting electrolyte including ring- or spiro-type ammonium salts is used together with a metal-ligand coordination compound, the transfer of cations or anions which act as the supporting electrolyte to facilitate redox reactions of a central metal of the coordination compound is enhanced. Therefore, the energy effectiveness of redox flow batteries is increased, and also the energy density of redox flow battery is increased since they may be used together with a high concentration of organic electrolyte in a particular non-aqueous solvent. Thus, according to the invention, redox flow batteries having both improved energy effectiveness and energy densities may be realized.

According to an embodiment of the invention, in Formula 1 or Formula 2, $Y^-$ may be at least one selected from $BF_4^-$, $Cl^-$, $Br^-$, $I^-$, $SO_4^{2-}$, $PF_6^-$, $ClO_4^-$ and $CF_3SO_3^-$.

For example, the supporting electrolyte may be salts of at least one selected from spiro-(1,1')-bipyrrolidinium (SBP), spiro-(1,1')-bipiperidinium (SBPI), piperidine-1-spiro-1-pyrrolidinium (PISP), 1-ethyl-1-methylpyrrolidinium (EMP), dimethylpyrrolidinium (DMP) and diethylpyrrolidinium (DEP) and counter anions thereof.

Examples of supporting electrolytes include, but are not limited to, spiro-(1,1')-bipyrrolidiniumtetrafluoroborate ($SBP-BF_4$), spiro-(1,1')-bipiperidinumtetrafluoroborate ($SBPI-BF_4$), piperidine-1-spiro-1'-pyrrolidiniumtetrafluoroborate ($PISP-BF_4$), 1-ethyl-1-methylpyrrolidiniumtetrafluoroborate ($EMP-BF_4$), dimethylpyrrolidiniumtetrafluoroborate ($DMP-BF_4$), or diethylpyrrolidiniumtetrafluoroborate ($DEP-BF_4$).

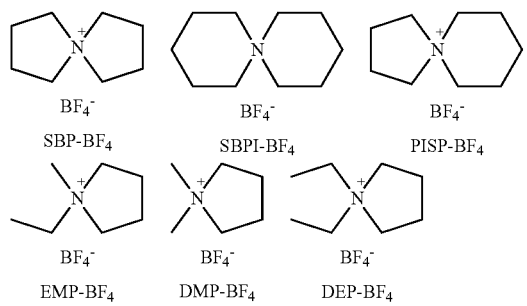

The supporting electrolyte having Formula 1 or Formula 2 may be present at a concentration of about 0.1M to 2M in a catholyte solution or an anolyte solution. If the concentration of supporting electrolyte is within the range set forth above, the effect of improved effectiveness of the battery is excellent. Moreover, the supporting electrolyte does not adversely affect the activity of the active substances.

According to an embodiment of the invention, central metals of metal-ligand coordination compounds in redox flow batteries may be at least one selected from Ni, Co, Fe, Ru, Zn, Mn, Y, Zr, Ti, Cr, Mg, Ce, Cu, Pb and V.

Ligands contained in the metal-ligand coordination compounds may be aliphatic ligands or aromatic ligands.

The ligands used may be at least one selected from dipyridyl, tert-pyridyl, ethylenediamine, propylenediamine, phenanthroline and N-heterocyclic carbine (NHC).

NHC may be any one selected from 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole and 1-ethyl-3-methylimidazole.

Examples of metal-ligand coordination compounds include, but are not limited to the following compounds.

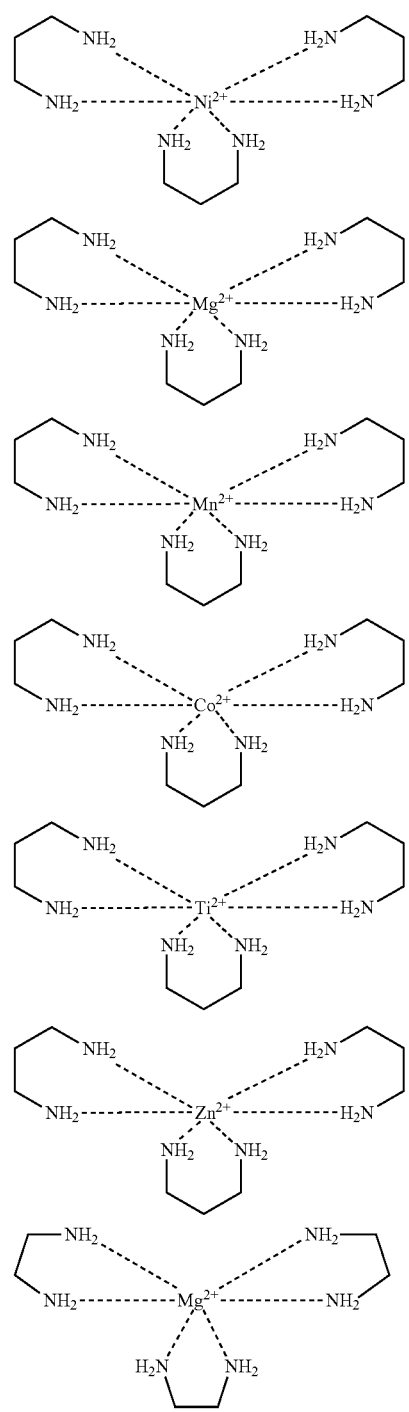

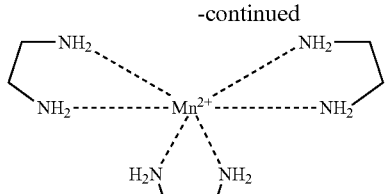
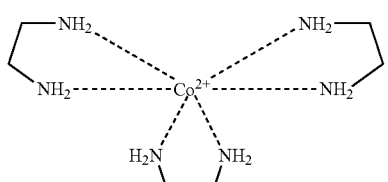
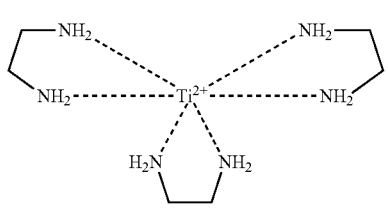
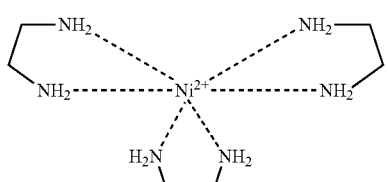
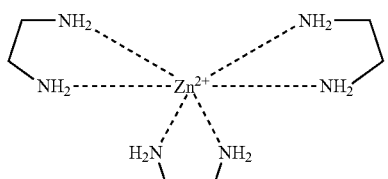
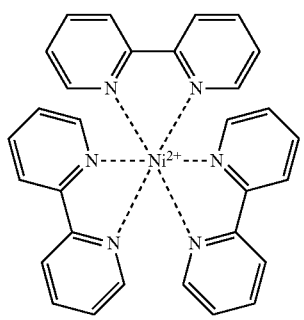
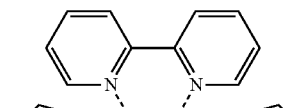
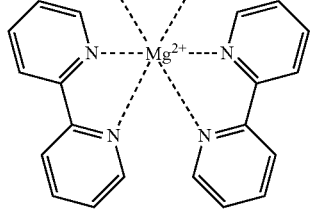
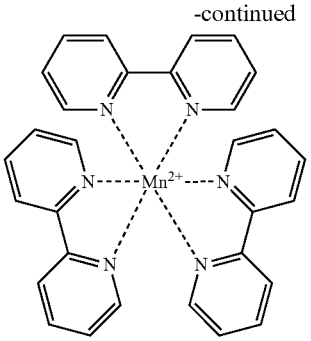
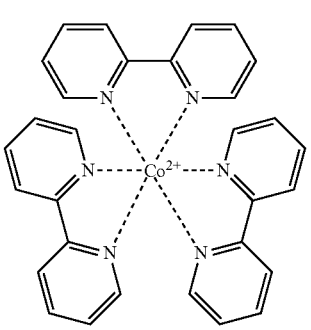
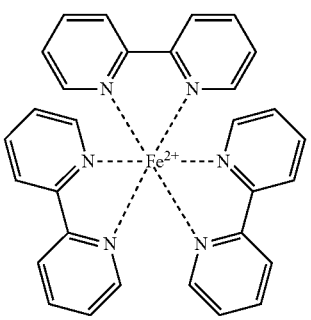
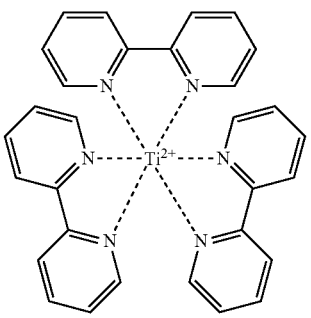
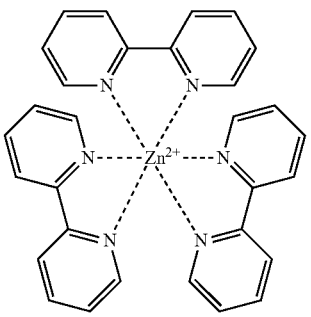

-continued
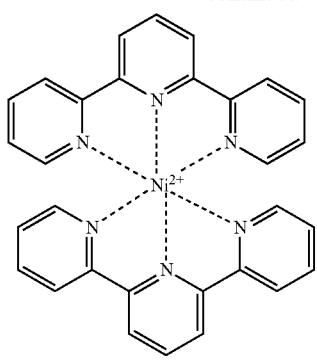
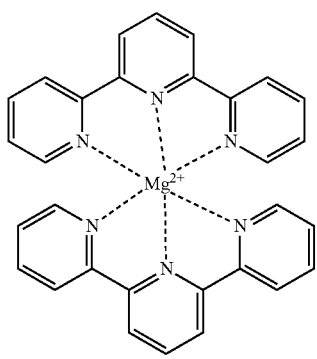
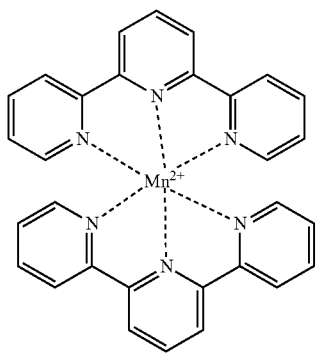
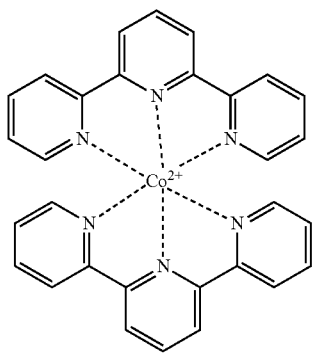
-continued
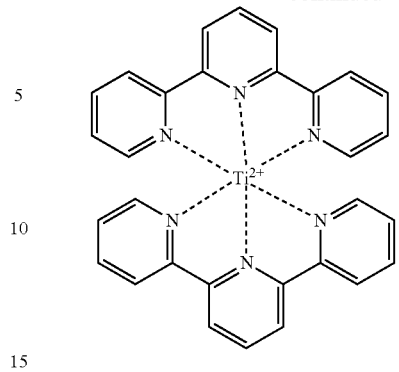
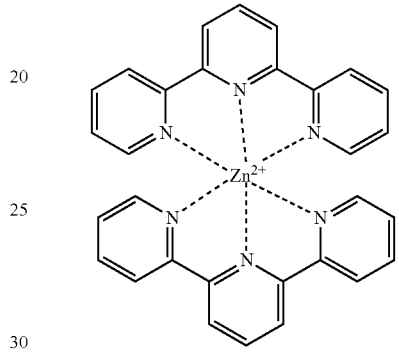
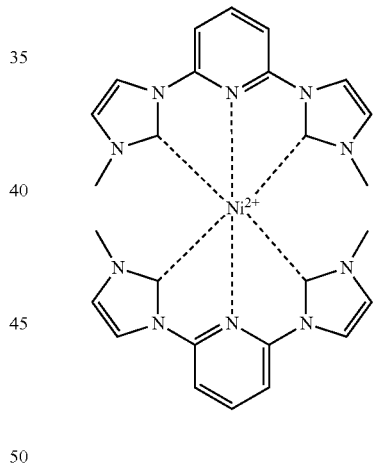
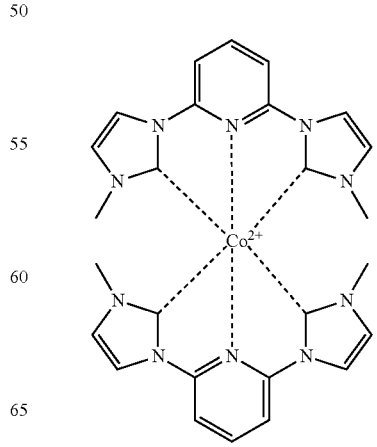

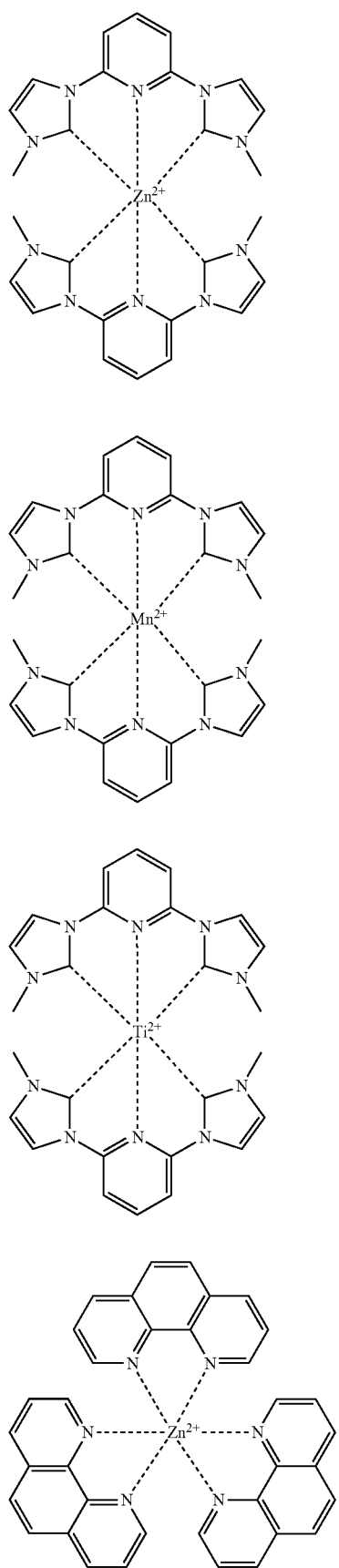

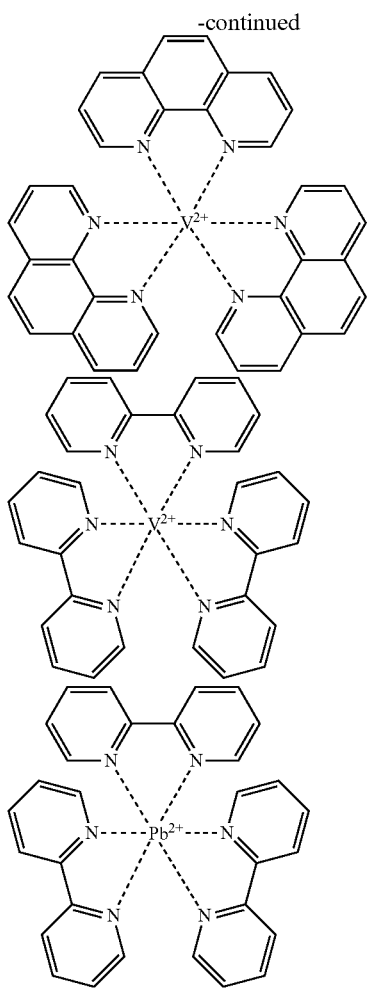

The metal-ligand coordination compounds may further include $BF_4^-$, $PF_6^-$, $CF_3SO_3^-$ or $(CF_3SO_2)_2N^-$ as counter anions.

The metal-ligand coordination compounds may be subjected to reversible redox reactions.

As non-aqueous solvents, at least one selected from dimethyl aceteamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, N,N-dimethylaceteamide and adiponitrile (ADPN) may be used.

According to an embodiment of the invention, a redox flow battery may further include a catholyte solution tank 21 and an anolyte solution tank 22, each of which is fluid connected with the cathode cell 1 and the anode cell 2.

Any conventional ion exchange membranes used in redox flow batteries may be used. Cation exchange membranes such as those obtained by sulfonation of a styrene-divinylbenzene copolymer; those obtained by addition of a sulfonate group to a copolymer base of tetrafluoroethylene and perfluorosulfonylethoxyvinylether; those formed from a copolymer of tetrafluoroethylene and perfluorovinylether with carboxy groups as side chains; those obtained by addition of a sulfonate group to an aromatic polysulfone copolymer base; and the like may be used.

The anion exchange membrane prevents the catholyte and anolyte from admixing, and allows the counter anions of the metal-ligand coordination compounds to be used as electric charge carriers. In this case, a sufficient number of electric charge carriers may be ensured using a small amount of supporting electrolyte. Furthermore, there is the advantage that high energy efficiencies of charge/discharge and voltage may be obtained by inhibiting the transfer of active substances, that is, cations.

When using general cation exchange membranes, salts of cations ($Na^+$, $Li^+$, $H^+$) are used as the source of electric charge carriers. However, solubility in organic solvents of such salts is low. When adding a small amount of water to increase the solubility, the ligand is destabilized, and redox reactions may not be performed reversibly. To the contrary, when anion exchange membranes are used, salts having high solubility in organic solvents may be introduced, and water may be completely removed. Thus, the decomposition of ligands may be prevented, and redox reactions of metal-ligand coordination compounds may be performed reversibly, resulting in improved properties of cycle and voltage.

Anion exchange membranes such as those aminated by addition of a chloromethyl group to a styrene-divinylbenzene copolymer base; those obtained by addition of a quaternary pyridinium to a vinylpyridine-divinylbenzene copolymer; those aminated by addition of a chloromethyl group to an aromatic polysulfone copolymer base; and the like may be used.

Commercially available anion exchange membranes include NEOSEPTA®-AMEX, NEOSEPTA®-AHA and NEOSEPTA®-ACS made by ASTOM; Cybron ionan MA3475 made by LANXESS; FAS, FAB, FAN, FAA and FAD made by FuMa-tech; and PC 100D, PC 200D and PC-SA made by PCA (Polymerchemie Altmeier).

The redox flow battery according to an embodiment of the invention is suitable for existing applications such as cellular phones, potable computers and the like, as well as applications such as electric vehicles which require high capacity and high power. Furthermore, redox flow batteries may be used in hybrid vehicles together with existing internal combustion engines, fuel cells, super capacitors and the like. In addition, the redox flow batteries of the invention may be used in other applications which require high capacity and high power.

Aspects of the present invention will be described in detail with reference to Examples and Comparative Examples, but is not be limited thereto.

PREPARATION EXAMPLE 1

$Fe^{2+}$—$(bpy)_3$ $[BF_4]_2$—Transfer of One Electron

To a 100 mL round-bottom flask, 15.24 g (29.88 mmol) of $Fe(BF_4)_2 \cdot 6H_2O$ is placed, and 50 mL of ethanol is added thereto. Then, the resulting mixture is stirred for about 20 min until the mixture becomes a solution.

To another 100 mL round-bottom flask, 14 g (89.64 mmol) of bipyridine is placed, and 80 mL of ethanol is added thereto. Then, the resulting mixture is stirred for about 10 min until the mixture becomes a solution.

The bipyridine solution is slowly added to the $Fe(BF_4)_2 \cdot 6H_2O$ solution, and the mixture stirred for about 3 hours at room temperature until the resulting mixed solution becomes gradually red in color. The resulting mixture is filtered, washed three times with 150 mL of water and ethanol, and then dried in air followed by additional drying in a vacuum oven to give 16.632 g (yield: 79.7%) of dark red solids.

PREPARATION EXAMPLE 2

$Ni^{2+}$—$(bpy)_3$ $[BF_4]_2$—Transfer of Two Electron

To a 100 mL round-bottom flask, 7.99 g (23.48 mmol) of $Ni(BF_4)_2 \cdot 6H_2O$ is placed, and 50 mL of ethanol is added thereto. Then, the resulting mixture is stirred for about 20 min until the mixture becomes a solution.

To another 100 mL round-bottom flask, 11 g (70.43 mmol) of bipyridine is placed, and 90 mL of ethanol is added thereto. Then, the resulting mixture is stirred for about 10 min until the mixture becomes a solution.

The bipyridine solution is slowly added to the Ni(BF$_4$)$_2$.6H$_2$O solution, and the mixture stirred for about 2.5 hours at room temperature until the resulting mixed solution changes from green to pink in color. The resulting mixture is filtered, washed three times with 150 mL of water and ethanol, and then dried in air followed by additional drying in a vacuum oven to give 15.09 g (yield: 91.7%) of pink solids.

EXAMPLE 1

Charging is performed using 0.2M Fe(bpy)$_3$(BF$_4$)$_2$ dissolved in 5 mL of propylene carbonate (PC) solvent as a catholyte solution and 0.2M Ni(bpy)$_3$BF$_4$ dissolved in 5 mL of propylene carbonate (PC) solvent as an anolyte solution. 0.5M SBPBF$_4$ salt is added to each of the electrolyte solutions as a supporting electrolyte.

The electrode used is prepared by drying a carbon felt (Nippon Graphite, GF20-3, t=3 mm, A=5☐5 cm$^2$) in air, and heat-treating for about 5 hours at about 50° C. A non-flow type battery is fabricated and evaluated as follows. As an ion exchange membrane, NEOSEPTA AMX model made by Tokuyama, and FAP4 model made by Fumatech are used.

An insulator, a current collector and a bipolar plate are layered with a nuts-integrated end plate disposed on the bottom. An electrode of 505 cm$^2$ square carbon felt is cut in half to form rectangles, and the cut carbon felts are inserted into the concave sections of the bipolar plate.

5 mL of the organic electrolyte solutions prepared in the above Preparation Examples are injected into each of the cathode carbon felt and anode carbon felt electrodes, and they are assembled. Bolts with disk springs are secured via a 1.5 Nm torque wrench on a diagonal line. After the completion of assembly, the remaining electrolyte solutions are injected through injection holes in each electrode, and the holes are sealed with Teflon® bolts. One Teflon® bolt having a gas leakage hole is used in each bipolar plate.

EXAMPLE 2

A redox flow battery is prepared by the same method as described in Example 1 except for using EMPBF$_4$ as a supporting electrolyte instead of SBPBF$_4$.

COMPARATIVE EXAMPLE 1

A redox flow battery is prepared by the same method as described in Example 1 except for using TEABF$_4$ as a supporting electrolyte instead of SBPBF$_4$.

COMPARATIVE EXAMPLE 2

A redox flow battery is prepared by the same method as described in Example 1 except for using TEMABF$_4$ as a supporting electrolyte instead of SBPBF$_4$.

Evaluation of Supporting Electrolyte Solubility

Figure 2:
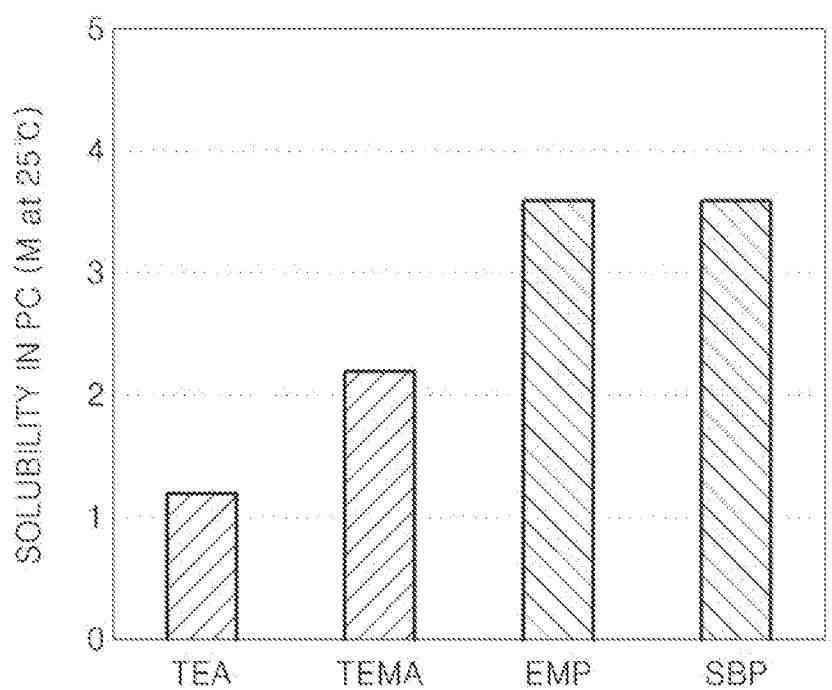
FIG. 2 is a graph showing the solubility in a non-aqueous solvent of supporting electrolytes used in the Examples and Comparative examples of the invention.
Figure 3:
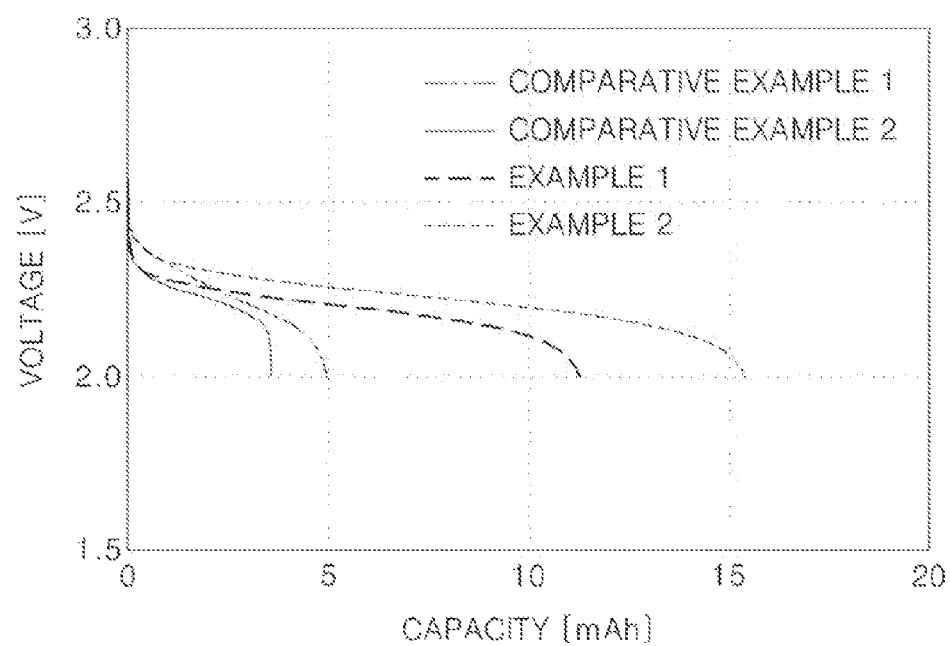
FIG. 3 is a graph showing the discharge capacity for batteries according to the Examples and Comparative examples of the invention.

Solubility in the non-aqueous solvent for each of supporting electrolytes used in Examples and Comparative Examples is measured, and the results are shown in FIG. 2.

The solvent used is propylene carbonate, and the extent of dissolution after stirring for about 1 hour at a constant concentration is identified visually. As can be seen from FIG. 2, ring- or spiro-type ammonium salts used in the redox flow battery according to an embodiment of the invention have excellent solubility in a non-aqueous solvent relative to conventional linear ammonium salts.

Evaluation of Organic Electrolyte Solubility

In the case where an organic electrolyte is used together with a supporting electrolyte, solubility of the organic electrolyte is evaluated. As the supporting electrolyte, TEABF$_4$ and SBPBF$_4$ are added to each of 0.0M, 0.2M, and 0.5M propylene carbonate aliquots, and then 1.2M Fe(bpy)$_3$(BF$_4$)$_2$ is added to a final volume of 10 mL. The generation of precipitates is identified for each case. The results are shown in Table 1 below.

TABLE 1

| Supporting electrolyte | | Solubility of |
| --- | --- | --- |
| Type | Mole | 1.2M Fe(bpy)$_3$(BF$_4$)$_2$ |
| TEABF$_4$ | 0.0 | Soluble |
| | 0.2 | Precipitation |
| | 0.5 | Precipitation |
| SBPBF$_4$ | 0.0 | Soluble |
| | 0.2 | Soluble |
| | 0.5 | Soluble |

As can be seen from Table 1, when using a supporting electrolyte according to the Examples of the invention, a high concentration of organic electrolyte solution may be prepared, which is favorable for obtaining high energy density values in a battery.

Evaluation of Charge/Discharge (Non-Flow Type Battery)

Charge/discharge tests are performed at room temperature (25° C.) using the batteries prepared in the Examples and Comparative Examples. Conditions for charge/discharge depend on the composition of each battery. In charging, the batteries are charged by about 2.6-2.8V using constant currents of from about 5 to about 10 mA. For discharging, the batteries are discharged by about 1.8V using constant currents of from about 5 to about 10 mA. The results of the charge/discharge tests are shown in Table 2 below.

TABLE 2

| | Discharge Capacity (mAh) | Effectiveness, % | | |
| --- | --- | --- | --- | --- |
| | | Charge-Discharge | Voltage | Energy |
| Comparative | 5.05 | 57.4 | 92.1 | 52.8 |
| Comparative | 4.10 | 82.4 | 89.1 | 73.4 |
| Example 1 | 11.2 | 83.0 | 93.7 | 77.8 |
| Example 2 | 15.6 | 87.3 | 95.3 | 83.2 |

As can be seen from Table 2, the batteries according to Examples of the invention exhibit discharge capacities three times or more greater than those of the comparative examples. In addition, the charge/discharge effectiveness, that is, the energy effectiveness of the batteries is improved by about 25-30%. The charge/discharge effectiveness is expressed by a value obtained by dividing an electric charge value for discharge by an electric charge value for charge, and then multiplying the product by 100. The energy effectiveness is expressed by a value obtained by multiplying charge/discharge effectiveness by voltage effectiveness.

Based on the two elements-reaction of 1.2M Fe(bpy)$_3$(BF$_4$)$_2$, the energy density is expressed by the multiplication product of the moles of ions, the total amount of electric charge and the average voltage of the battery. The energy density expressed by Wh/kg is obtained by dividing this value by the electrolyte solution density.

Based on the use of 1.2M Fe(bpy)$_3$(BF$_4$)$_2$ according to the invention, the energy density is improved by 28.6 (Wh/kg) relative to 20.4 (Wh/kg) in an aqueous system.

As shown in the above results, it is demonstrated that the redox flow batteries according to an embodiment of the invention have high values in density and effectiveness of energy.

According to an aspect of the invention, it is possible to obtain redox flow batteries having high energy efficiencies and energy densities by using a supporting electrolyte in which a high concentration of electrolyte solution is prepared and side reactions are inhibited.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A redox flow battery comprising:
a cathode cell including a cathode and a catholyte solution;
an anode cell including an anode and an anolyte solution; and
an ion exchange membrane disposed between the cathode cell and the anode cell;
wherein each of the catholyte solution and the anolyte solution includes a non-aqueous solvent, a supporting electrolyte and a metal-ligand coordination compound;
wherein the supporting electrolyte includes at least one salt selected from the group consisting of those of the following Formula 1 or Formula 2

[Formula 1]

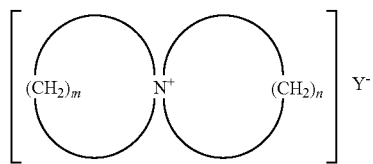

[Formula 2]

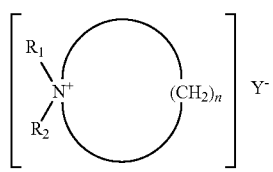

wherein:
m is an integer of 3 to 7,
n is an integer of 3 to 7,
Y$^-$ represents a counter anion of at least one selected from BF$_4^-$, Cl$^-$, Br$^-$, I$^-$, SO$_4^{2-}$, PF$_6^-$, ClO$_4^-$ and CF$_3$SO$_3{}^-$, and
R$_1$ and R$_2$ each represent, independently, an alkyl group having from 2 to about 5 carbon atoms, or an alkoxy group having from 1 to about 5 carbon atoms.

2. The redox flow battery according to claim 1, wherein the supporting electrolyte is a salt of at least one cation selected from spiro-(1,1')-bipyrrolidinium (SBP), spiro-(1,1')-bipiperidinium (SBPI), piperidine-1-spiro-1-pyrrolidinium (PISP) and diethylpyrrolidinium (DEP) and counter anions thereof.

3. The redox flow battery according to claim 1, wherein the supporting electrolyte is at least one selected from spiro-(1,1')-bipyrrolidiniumtetrafluoroborate (SBP-BF$_4$), spiro-(1,1')-bipiperidinumtetrafluoroborate (SBPI-BF$_4$), piperidine-1-spiro-1'-pyrrolidiniumtetrafluoroborate (PISP-BF$_4$) and diethylpyrrolidiniumtetrafluoroborate (DEP-BF$_4$).

4. The redox flow battery according to claim 1, wherein the supporting electrolyte is present at a concentration of 0.1M to 2M in the electrolyte solution.

5. The redox flow battery according to claim 1, wherein the metal of the metal-ligand coordination compound is at least one selected from Ni, Co, Fe, Ru, Zn, Mn, Y, Zr, Ti, Cr, Mg, Ce, Cu, Pb and V.

6. The redox flow battery according to claim 1, wherein the ligand of the metal-ligand coordination compound is at least one selected from dipyridyl, tert-pyridyl, ethylenediamine, propylenediamine, phenanthroline and N-heterocyclic carbine (NHC).

7. The redox flow battery according to claim 6, wherein NHC is selected from 2,6-bis(methylimidazole-2-ylidene)pyridine, 1,3-dimesitylimidazole, 1,3-bis(2,5-diisopropylphenyl)imidazole, 1,3-dimethylimidazole, 1,3-di-tert-butylimidazole, 1,3-dicyclohexylimidazole and 1-ethyl-3-methylimidazole.

8. The redox flow battery according to claim 1, wherein the metal-ligand coordination compound is at least one of the following compounds

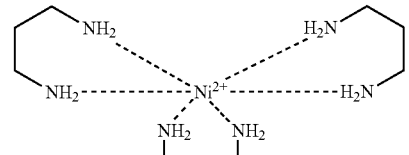

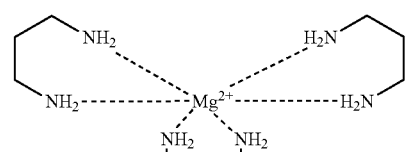

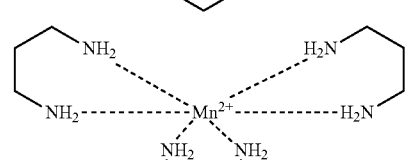

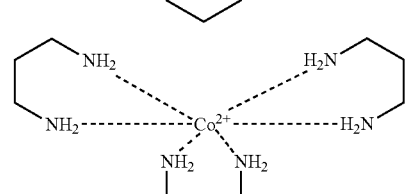

-continued
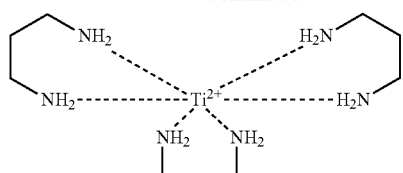
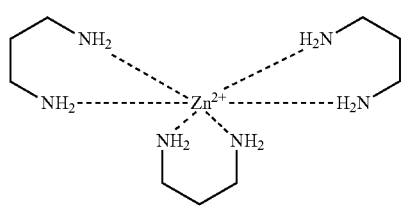
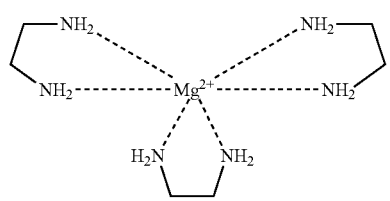
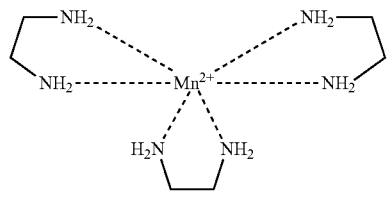
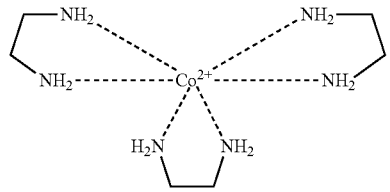
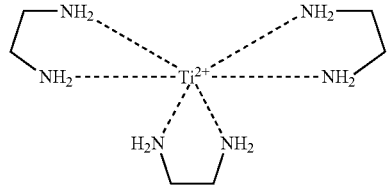
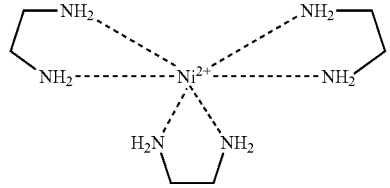
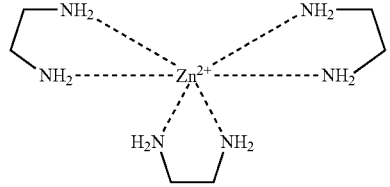
-continued
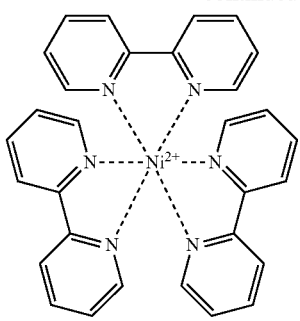
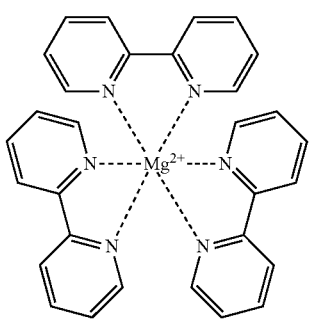
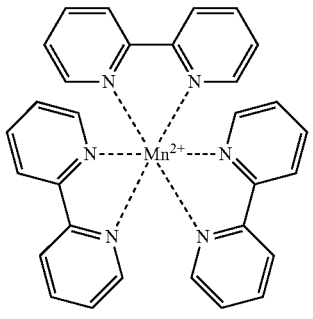
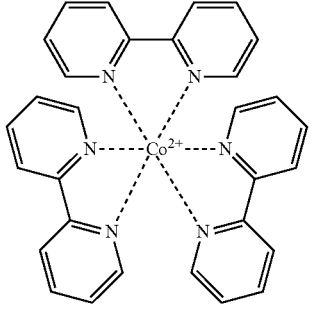
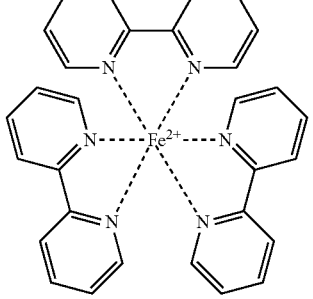

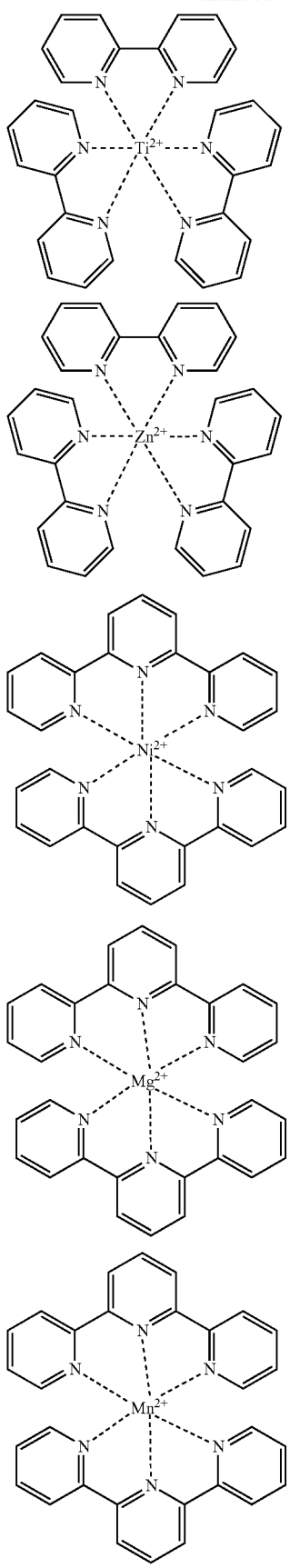
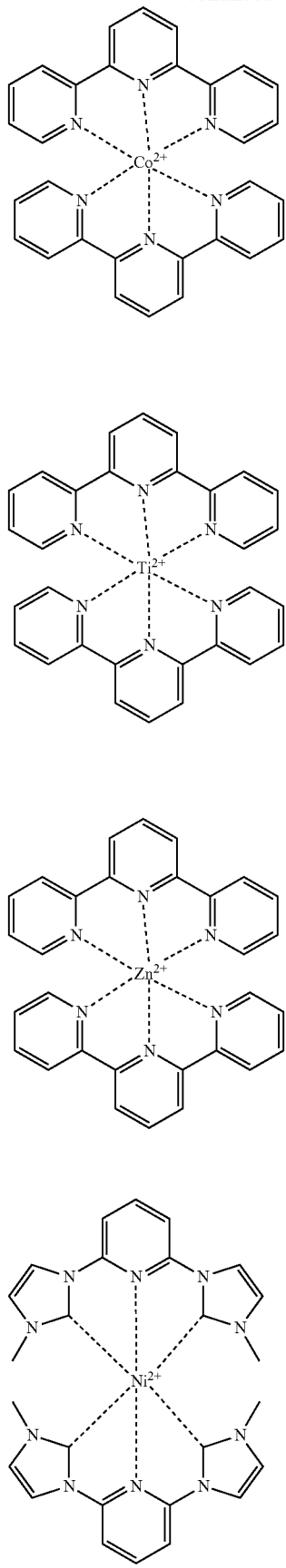

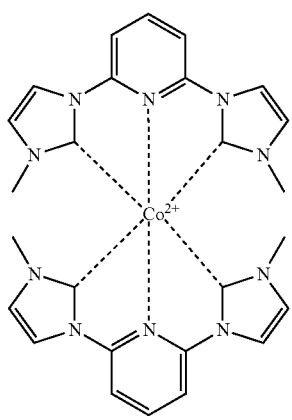
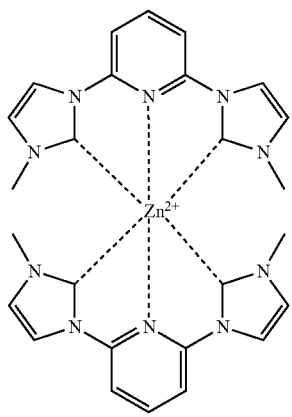
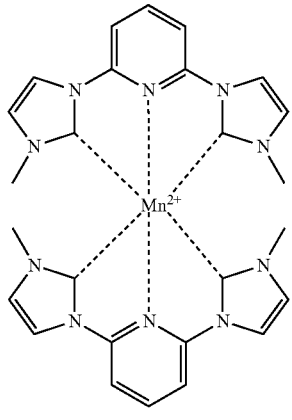
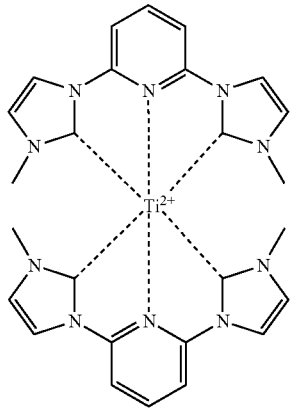
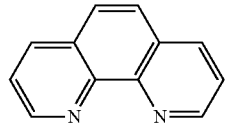
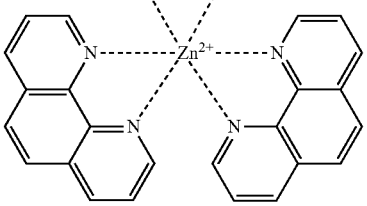
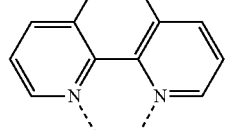
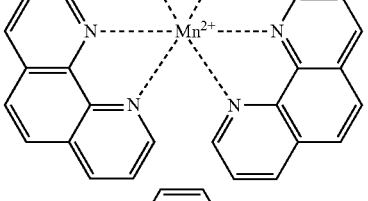
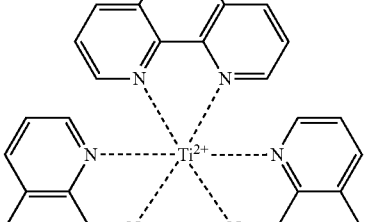

-continued

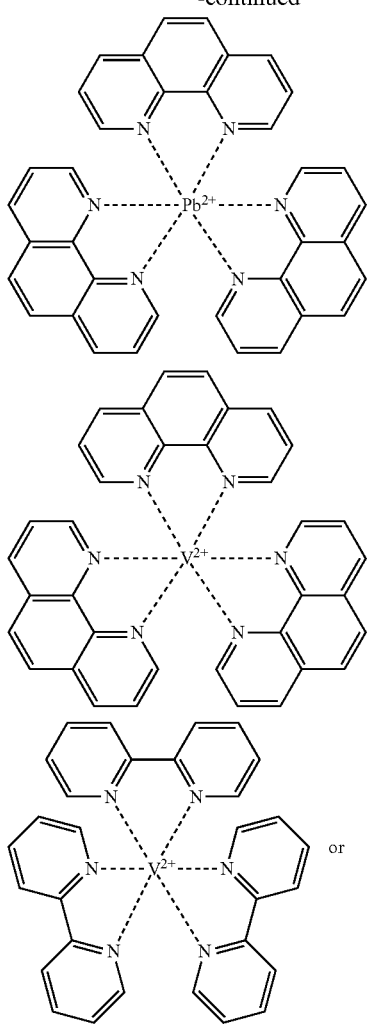

-continued

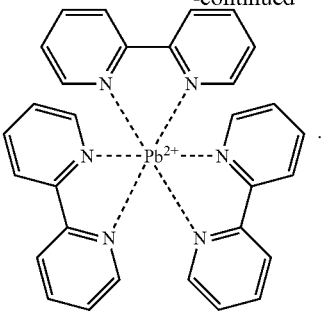

9. The redox flow battery according to claim 1, further comprising $BF_4^-$, $PF_6^-$, $CF_3SO_3^-$ or $(CF_3SO_2)_2N^-$ as a counter anion of the metal-ligand coordination compound.

10. The redox flow battery according to claim 1, wherein the non-aqueous solvent is at least one selected from dimethyl aceteamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate and N,N-dimethylaceteamide.

11. The redox flow battery according to claim 1, wherein the metal-ligand coordination compound is subject to reversible redox reactions.

12. The redox flow battery according to claim 1, wherein the ion exchange membrane is an anion exchange membrane.

13. The redox flow battery according to claim 12, wherein the anion exchange membrane is an anion exchange membrane aminated by addition of a chloromethyl group to a styrene-divinylbenzene copolymer base; an anion exchange membrane obtained by addition of a quaternary pyridinium to a vinylpyridine-divinylbenzene copolymer; or an anion exchange membrane aminated by addition of a chloromethyl group to an aromatic polysulfone copolymer base.

14. The redox flow battery according to claim 1, further comprising a catholyte solution tank and an anolyte solution tank, each of which is fluid communicated to the cathode cell and the anode cell.

\* \* \* \* \*